(12) United States Patent
Jung et al.

(10) Patent No.: US 7,964,306 B2
(45) Date of Patent: Jun. 21, 2011

(54) LITHIUM RECHARGEABLE BATTERY HAVING ELECTRODE PIN

(75) Inventors: Sang Sok Jung, Youngin-si (KR); Se Yun Kim, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 334 days.

(21) Appl. No.: 11/369,995

(22) Filed: Mar. 8, 2006

(65) Prior Publication Data
US 2006/0216593 A1 Sep. 28, 2006

(30) Foreign Application Priority Data
Mar. 24, 2005 (KR) .................. 10-2005-0024660

(51) Int. Cl.
*H01M 2/02* (2006.01)
(52) U.S. Cl. ......... 429/179; 429/178; 429/184; 429/181
(58) Field of Classification Search .................. 429/184, 429/178, 181, 179
See application file for complete search history.

(56) References Cited

U.S. PATENT DOCUMENTS

| | | | | |
|---|---|---|---|---|
| 5,876,868 A | * | 3/1999 | Tanida | 429/56 |
| 6,509,115 B2 | * | 1/2003 | Kim et al. | 429/175 |
| 2003/0091897 A1 | * | 5/2003 | Oogaku et al. | 429/181 |
| 2004/0209164 A1 | * | 10/2004 | Wada et al. | 429/181 |

FOREIGN PATENT DOCUMENTS

| | | | |
|---|---|---|---|
| CN | 1441505 | | 9/2003 |
| CN | 1526176 | | 9/2004 |
| JP | 09-298056 | | 11/1997 |
| JP | 09298056 A | * | 11/1997 |
| JP | 2000-133243 | | 5/2000 |
| JP | 2001-196047 | | 7/2001 |
| JP | 2002-245991 | | 8/2002 |
| JP | 2004-214175 | | 7/2004 |
| JP | 2005-158267 | | 6/2005 |
| KR | 1020050041303 | | 5/2005 |

* cited by examiner

*Primary Examiner* — Dah-Wei D Yuan
*Assistant Examiner* — Zachary Best
(74) *Attorney, Agent, or Firm* — H.C. Park & Associates, PLC

(57) ABSTRACT

A lithium rechargeable battery includes an electrode assembly, a can containing the electrode assembly, a cap plate coupled to the top opening of the can and provided with a terminal through-hole, and an electrode pin inserted into the terminal through-hole. The electrode pin has a head shaped like a flat plate, a post extending from the lower surface of the head, and a protrusion formed along the edge of the upper surface of the head.

9 Claims, 3 Drawing Sheets

LITHIUM RECHARGEABLE BATTERY HAVING ELECTRODE PIN

CROSS REFERENCE TO RELATED APPLICATION

This application claims priority to and the benefit of Korean Patent Application No. 10-2005-24660 filed Mar. 24, 2005, which is hereby incorporated by reference for all purposes as if fully set forth herein.

BACKGROUND OF THE INVENTION

1. Field of the Invention

The present invention relates to a lithium rechargeable battery, and more particularly to a lithium rechargeable battery adapted to prevent a formation process contact pin from slipping on the head of the battery's electrode pin.

2. Discussion of the Background

Portable electronic appliances may require batteries having a high energy density, such as rechargeable lithium batteries, as their power source.

Lithium rechargeable batteries create electric energy by oxidation and reduction reactions during intercalation and deintercalation of lithium ions at the positive and negative electrodes. Materials that enable lithium ions to undergo reversible intercalation and deintercalation are used as the active materials of the positive and negative electrodes of lithium rechargeable batteries. In addition, an organic electrolyte or a polymer electrolyte may be used to fill the space between the positive and negative electrodes.

Lithium-containing metal oxides such as lithium cobalt oxide ($LiCoO_2$), lithium nickel oxide ($LiNiO_2$), and lithium manganese oxide ($LiMnO_2$) may be used as the positive electrode active material of the lithium rechargeable batteries. Lithium metal or lithium alloy may be used as the negative electrode active material.

However, lithium batteries may short-circuit and explode when lithium metal is used due to dendrite formation. Therefore, lithium metal may be replaced by carbon-based materials, such as amorphous carbon and crystalline carbon. The lithium rechargeable batteries may be manufactured in various shapes, such as cylinders, squares, and pouches.

FIG. 1 is an exploded perspective view showing a conventional lithium rechargeable battery.

Referring to FIG. 1, the lithium rechargeable battery may be formed by placing an electrode assembly 12 including a first electrode 13, a second electrode 15, a separator 14, and an electrolyte into a can 10 and sealing the top of the can 10 with a cap assembly 20.

The cap assembly 20 may include a cap plate 40, an insulation plate 50, a terminal plate 60, and an electrode pin 30. The cap assembly 20 may be coupled to the top opening of the can to seal the can 10 and may be insulated from the electrode assembly 12 by a separated insulation case 70.

The cap plate 40 may be made of a metal plate with a size and a shape corresponding to the top opening of the can 10. The cap plate 40 may have a terminal through-hole 41 arranged at its center. The electrode pin 30 may be inserted into the terminal through-hole 41. A tubular gasket 35 may be coupled to the outer surface of the electrode pin 30 to insulate the electrode pin 30 from the cap plate 40 when the electrode pin 30 is inserted into the terminal through-hole 41. The cap plate 40 may have an electrolyte injection hole 42 arranged on one side and a safety vent (not shown) arranged on another side. The safety vent may be integrally formed by reducing the sectional thickness of the cap plate 40. The cap assembly 20 may be assembled to the top opening of the can 10, and an electrolyte may be injected via the electrolyte injection hole 42, which is then sealed by a plug 43.

The electrode pin 30 may be coupled with a second electrode tab 17 of the second electrode 15 or to a first electrode tab 16 of the first electrode 13. The electrode pin may act as a second or first electrode terminal. The first electrode tab 16 and the second electrode tab 17 may be drawn out of the electrode assembly 12. Insulation tape 18 may be wound around portions of the first electrode tab 16 and the second electrode tab 17 to prevent a short circuit between the first electrode 13 and the second electrode 15. The first electrode 13 or the second electrode 15 may act as a positive or negative electrode.

After assembly, the lithium rechargeable battery may undergo a series of formation processes including charging, aging, and discharging to stabilize the battery structure and make it ready for use. The formation process equipment may include a contact pin, which may be used to charge the battery to give it desired characteristics or to inspect the battery's performance. The contact pin may slip in the lateral direction on the head of a conventional electrode pin and cause poor contact. This may degrade the battery's performance, life span, and safety.

SUMMARY OF THE INVENTION

The present invention provides a lithium rechargeable battery that includes an electrode pin that has a protrusion formed on its head to prevent a formation process contact pin from slipping on the head and causing poor contact during a formation process.

Additional features of the invention will be set forth in the description which follows, and in part will be apparent from the description, or may be learned by practice of the invention.

The present invention discloses a lithium rechargeable battery including an electrode assembly; a can containing the electrode assembly; a cap plate coupled to the top opening of the can and provided with a terminal through-hole; and an electrode pin inserted into the terminal through-hole, wherein the electrode pin has a head shaped like a flat plate, a post extending from the lower surface of the head, and a protrusion formed along the edge of the upper surface of the head.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrated embodiments of the invention, and together with the description serve to explain the principles of the invention.

FIG. 2b is a sectional view taken along line A-A' of FIG. 2a.

DETAILED DESCRIPTION OF THE ILLUSTRATED EMBODIMENTS

Figure 1:
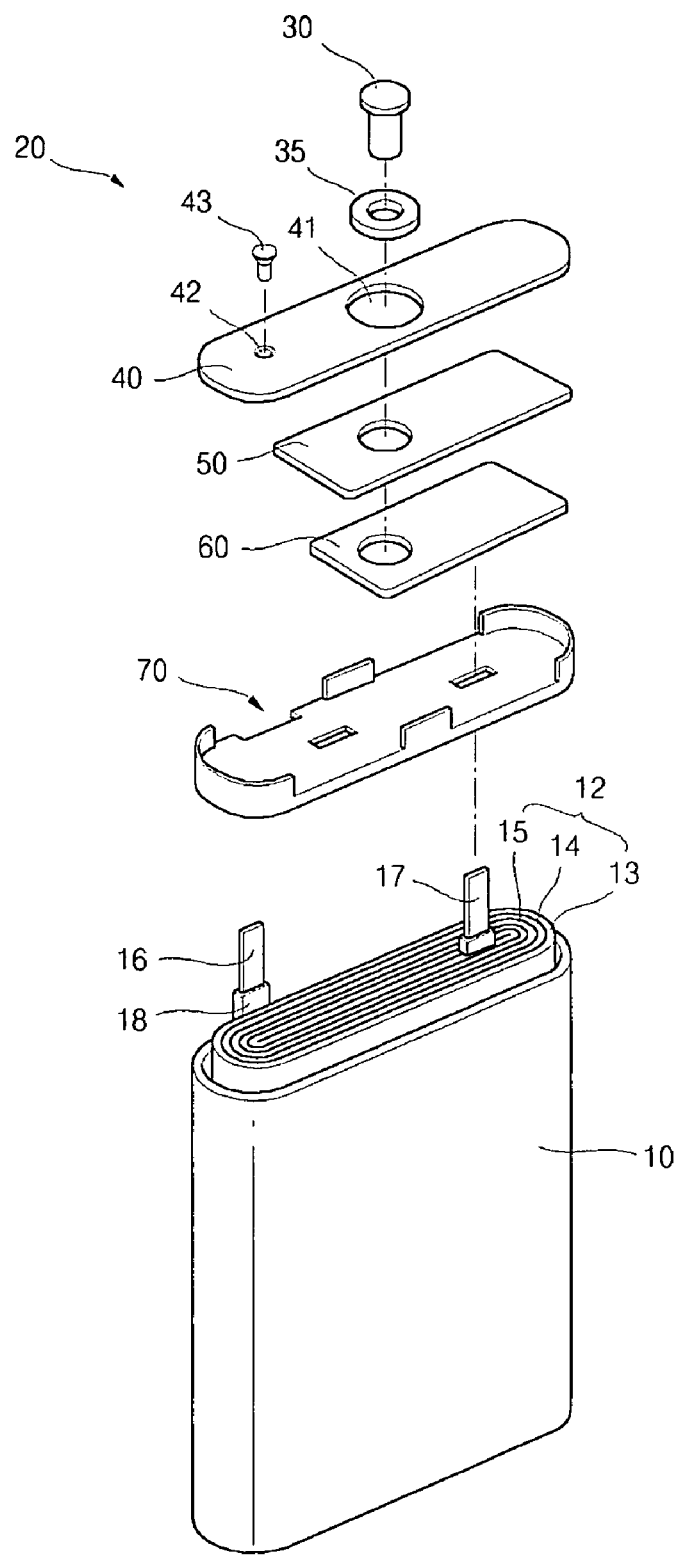
FIG. 1 is an exploded perspective view showing a conventional lithium rechargeable battery.

The invention is described more fully hereinafter with reference to the accompanying drawings, in which embodiments of the invention are shown. This invention may, however, be embodied in many different forms and should not be construed as limited to the embodiments set forth herein. Rather these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2A:
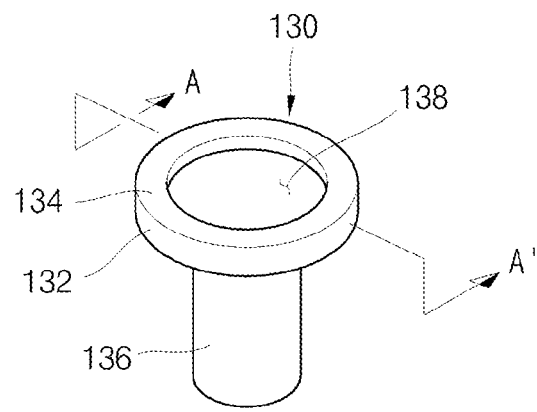
FIG. 2a is a perspective view showing an electrode pin according to an exemplary embodiment of the present invention.
Figure 2B:
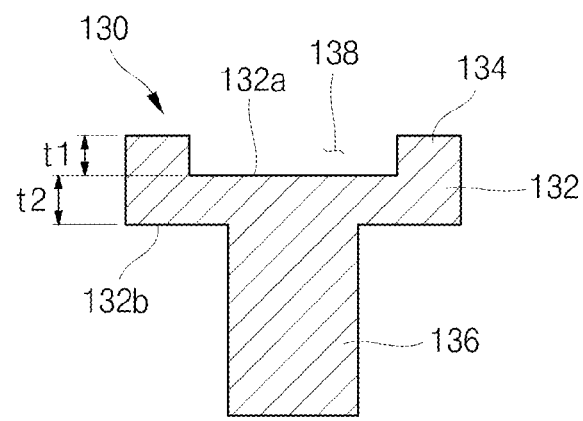

FIG. 2a is a perspective view showing an electrode pin according to an exemplary embodiment of the present invention. FIG. 2b is a sectional view taken along line A-A' of FIG. 2a.

Referring to FIG. 2a and FIG. 2b, the electrode pin 130 may include a head 132 shaped like a flat plate, a post 136 extending from the lower surface 132b of the head 132, and a protrusion 134 formed along the edge of the upper surface 132a of the head 132.

The electrode pin 130 may be made of a material with excellent electrical conductivity, low price, and good workability, such as aluminum or aluminum alloy.

The head 132 may have virtually any shape, such as a circle, an ellipse, a square, or a rectangle. The protrusion 134 may protrude upwards to a desired height and may be located along the edge of the upper surface 132a of the head 132 to define a groove 138 in a central region of the head 132.

The protrusion 134 may be formed by press processing the head 132. The height $t_1$ of the protrusion 134 may be equal to or less than about four times the thickness $t_2$ of the head 132. If the height $t_1$ of the protrusion is larger than four times the thickness $t_2$ of the head, excessive shaping stress on the head 132 may degrade the strength of or deform the electrode pin 130. The height $t_1$ of the protrusion may be chosen based on the material properties of the electrode pin 130.

Figure 3:
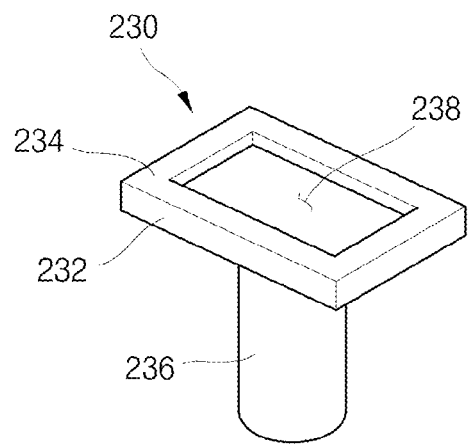
FIG. 3 is a perspective view showing an electrode pin according to an exemplary embodiment of the present invention.

FIG. 3 is a perspective view showing an electrode pin according to another exemplary embodiment of the present invention.

Referring to FIG. 3, the electrode pin 230 includes a head 232 in the shape of a square flat plate, a post 236 extending from the lower surface of the head 232, and a protrusion 234 formed along the edge of the upper surface of the head 232 to define a groove 238 in a central region of the head 232. The protrusion may include a number of portions having different heights (not shown).

Figure 4:
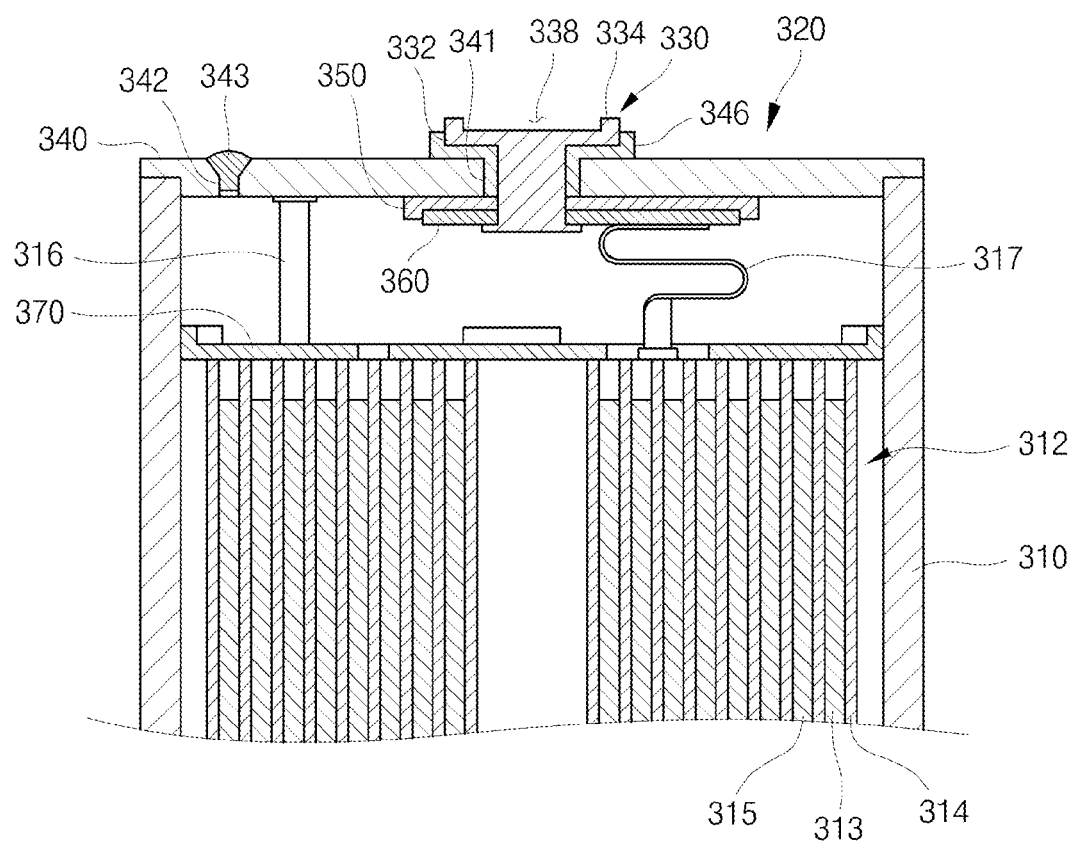
FIG. 4 is a partial sectional view showing a lithium rechargeable battery according to an exemplary embodiment of the present invention.

FIG. 4 is a partial sectional view showing a lithium rechargeable battery according to an exemplary embodiment of the present invention.

Referring to FIG. 4, the lithium rechargeable battery may include a can 310, an electrode assembly 312 contained in the can 310, and a cap assembly 320 coupled to the top of the can 310.

The can 310 may have an approximately square shape with an open top and may be made of a metallic material, such as aluminum, aluminum alloy, or a light and ductile stainless steel. The can 310 may act as a terminal on its own.

The electrode assembly 312 may include a first electrode 313, a second electrode 315, and a separator 314. The first electrode 313 and the second electrode 315 may be laminated with the separator 314 interposed between them, and wound into a jelly-roll shape. The first electrode 313 and the second electrode 315 may be coupled with a first electrode tab 316 and a second electrode tab 317, respectively, using a conductive adhesive or by a welding process, such as laser welding, ultrasonic welding, or resistance welding. The first electrode tab 316 and the second electrode tab 317 may protrude upward.

The first electrode 313 and the second electrode 315 may have opposite polarities and may act as a positive electrode and a negative electrode, respectively, or vice versa. The first electrode 313 and the second electrode 315 may each include a collector and an electrode active material applied to at least one surface of the collector. The electrode active material may be positive or negative depending on the desired polarity of the electrode.

The positive electrode collector may be made of stainless steel, nickel, aluminum, titanium, or an alloy thereof or may be made of aluminum or stainless steel which has been surface treated with carbon, nickel, titanium, or silver. The negative electrode collector may be made of stainless steel, nickel, copper, titanium, or an alloy thereof or may be made of copper or stainless steel which has been surface treated with carbon, nickel, titanium, or silver.

The positive electrode active material may be a conventional lithium-containing transition metal oxide or lithium chalcogenide compound. A metal oxide such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, M indicating metal, such as Al, Sr, Mg, or La) may be used. The negative electrode active material may be lithium metal, a lithium alloy, or a carbon material, such as crystalline carbon, amorphous carbon, carbon composite, and carbon fiber.

The separator 314 may prevent a short circuit between the first electrode 313 and the second electrode 315 and may provide lithium ions with a passage for movement. The separator 314 may be made of high molecular weight film based on a polyolefin, such as polypropylene and polyethylene. The separator 314 may be a multiple film, a micro-porous film, a woven fabric, or a non-woven fabric.

The cap assembly 320, which may be coupled to the top of the can 310, may include a cap plate 340, an insulation plate 350, a terminal plate 360, and an electrode pin 330. The cape plate 340 may be made of a metal plate with a size and a shape corresponding to the top opening of the can 310. The cap plate 340 may have a terminal through-hole 341 arranged at its center portion, and an electrolyte injection hole 342 arranged at a side thereof. An electrolyte may be injected via the electrolyte injection hole 342, and the electrolyte injection hole 342 may be sealed by a plug 343.

The electrode pin 330 may be inserted into the terminal through-hole 341 and may have a tubular gasket 346 arranged on its outer surface to insulate the electrode pin 330 from the cap plate 340. The electrode pin 330 may have a protrusion 334 formed along the edge of the upper surface of its head 332 to define a groove 338 in a central region of the head 332. The protrusion 334 may prevent a formation process contact pin from slipping and losing contact with the upper surface of the head 332 of the electrode pin 330.

The gasket 346 may be made of polypropylene or a thermoplastic fluoride-based resin, such as polytetrafluoroethylene (PTFE), tetrafluoroethylene-perfluoroalkylvinylether copolymer (PFA), or tetrafluoroethylene-hexafluoropropylene copolymer (FEP).

The insulation plate 350 may be positioned on the lower surface of the cap plate 340. The terminal plate 360 may be positioned on the lower surface of the insulation plate 350. The bottom of the electrode pin 330 may be coupled with the terminal plate 360. The insulation plate 350 may be interposed between the bottom of the electrode pin 330 and the terminal plate 360.

The first electrode tab 316 may be welded to the lower surface of the cap plate 340 and the second electrode tab 317 may be welded to the terminal plate 360. The first electrode tab 316 and the second electrode tab 317 may be made of nickel.

The electrode assembly 312 may have an insulation case 370 arranged on the top of the electrode assembly 312 to electrically insulate the electrode assembly 312 from the cap assembly 320 and fix the position of the electrode assembly 312 and the first electrode tab 316 and the second electrode tab 317. The insulation case 370 may be made of an insulating high molecular weight resin, such as polypropylene (PP).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A lithium rechargeable battery comprising:
   an electrode assembly;
   a can containing the electrode assembly;
   a cap plate coupled to an opening of the can and provided with a terminal through-hole; and
   an electrode pin inserted into the terminal through-hole,
   wherein the electrode pin has a flat head including a first surface facing the electrode assembly and a second surface opposite the first surface and exposed outside of the rechargeable battery, the second surface including a first portion being an edge region and a second portion being a central region, a post extending from the first surface of the head, and a protrusion extending from the first portion in a direction away from the first surface to define a groove in the second portion,
   wherein the protrusion includes an inner edge facing the groove and an outer edge opposite the inner edge,
   wherein the outer edge of the protrusion is aligned with an edge of the first surface,
   wherein the protrusion is formed by press processing,
   wherein a height of the protrusion is equal to or less than about four times a thickness of the head, and
   wherein the protrusion is formed continuously along an edge of the second surface of the flat head.

2. The lithium rechargeable battery of claim 1,
   wherein the head has the shape of a circle, an ellipse, a rectangle, or a square.

3. The lithium rechargeable battery of claim 1,
   wherein the electrode pin is made of aluminum or aluminum alloy.

4. The lithium rechargeable battery of claim 1,
   wherein an insulation gasket is coupled to the electrode pin and the insulation gasket is inserted into the terminal through-hole.

5. The lithium rechargeable battery of claim 4,
   wherein the insulation gasket is made of polypropylene or a thermoplastic fluoride-based resin.

6. The lithium rechargeable battery of claim 5,
   wherein the thermoplastic fluoride-based resin is polytetrafluoroethylene, tetrafluoroethylene-perfluoroalkylvinylether copolymer, or tetrafluoroethylene-hexafluoropropylene copolymer.

7. The lithium rechargeable battery of claim 1,
   wherein the protrusion comprises a plurality of portions having different heights.

8. The lithium rechargeable battery of claim 1,
   wherein a first end of the electrode pin is inside of the rechargeable battery and a second end of the electrode pin is outside of the rechargeable battery, and
   wherein a width of the first end is less than a width of the second end.

9. The lithium rechargeable battery of claim 1,
   wherein a width of the groove in the second portion exceeds a width of the post.

* * * * *